E. BALL.
3 Sheets—Sheet 1.
Mower.
No. 1,011.
Reissued July 17, 1860.
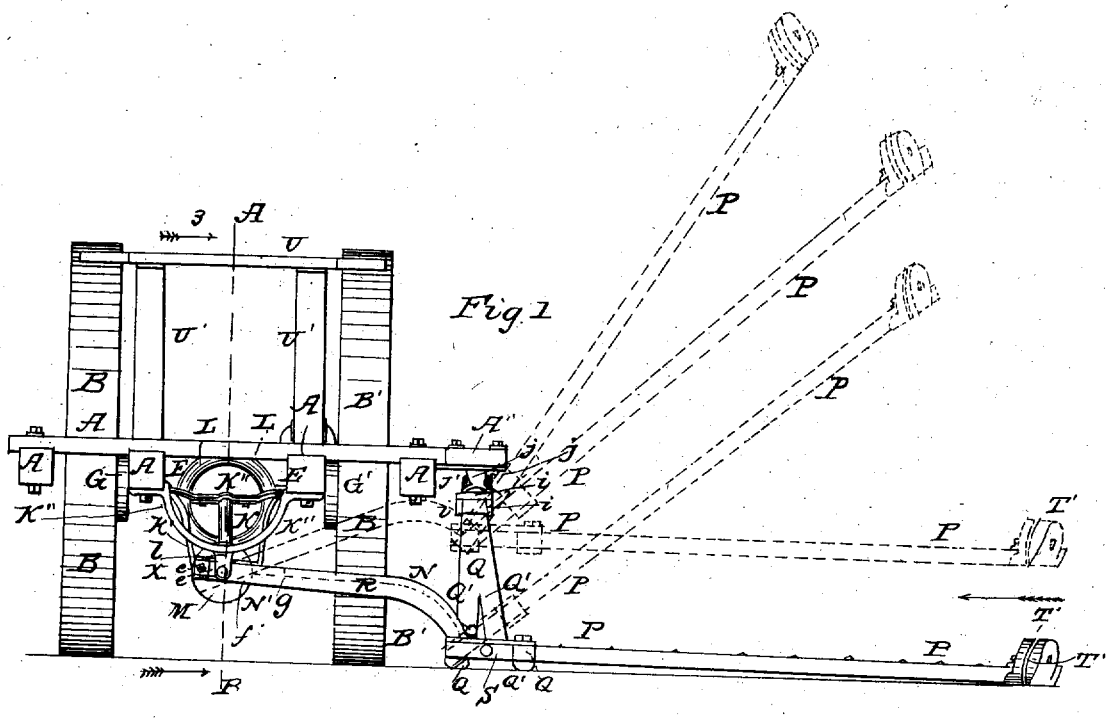
WITNESSES
A. Wooster
H. York A. Lee
INVENTOR
Ephraim Ball
By his Atty
Hoy H. Dodge
N. PETERS, Photo-Lithographer, Washington, D. C.

E. BALL.

3 Sheets—Sheet 2.

Mower.

No. 1,011.

Reissued July 17, 1860.

WITNESSES
A. Cridtenden
R. Yates & Co.

INVENTOR
Ephraim Ball
by his Attorneys Thos. H. Dodge

N. PETERS, Photo-Lithographer, Washington, D. C.

3 Sheets—Sheet 3.

E. BALL.

Mower.

No. 1,011.

Reissued July 17, 1860.

WITNESSES

A. C. Wadsworth

H. M. Curley

INVENTOR

E. Ball

By his Attorney

Thos. H. Dodge

N. PETERS, Photo-Lithographer, Washington, D. C.

UNITED STATES PATENT OFFICE.

EPHRAIM BALL, OF CANTON, OHIO.

IMPROVEMENT IN MOWING-MACHINES.

Specification forming part of Letters Patent No. 18,788, dated December 1, 1857; Reissue No. 832, dated September 27, 1859; Reissue No. 1,011, dated July 17, 1860.

DIVISION No. 2.

*To all whom it may concern:*

Be it known that I, EPHRAIM BALL, of Canton, in the county of Stark, in the State of Ohio, have invented certain new and useful Improvements in Mowing-Machines, of which the following is a full clear, and exact description, reference being had to the accompanying drawings, which make a part of this specification, and in which—

Figure 5:
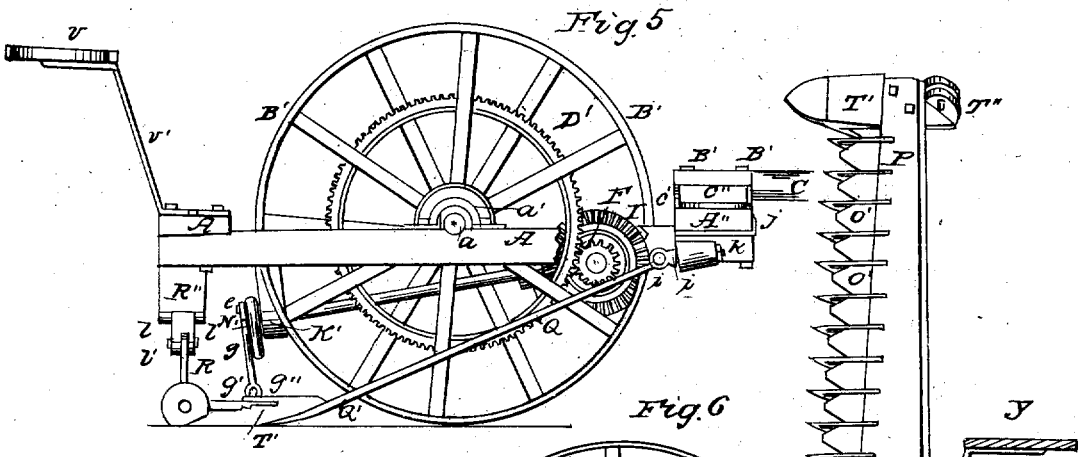
Figure 6:
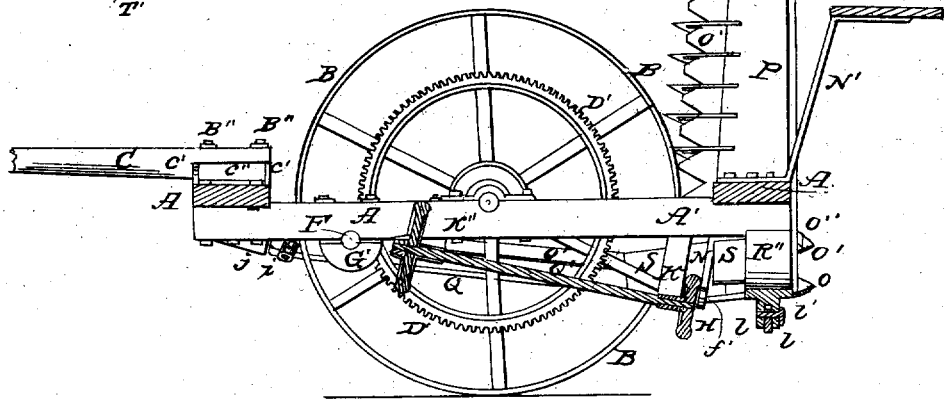
Figure 7:
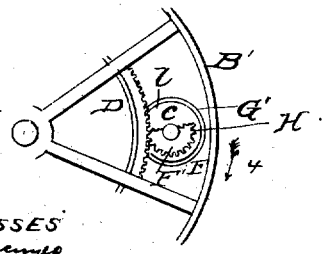
Figure 8:
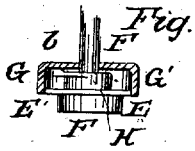
Figure 10:
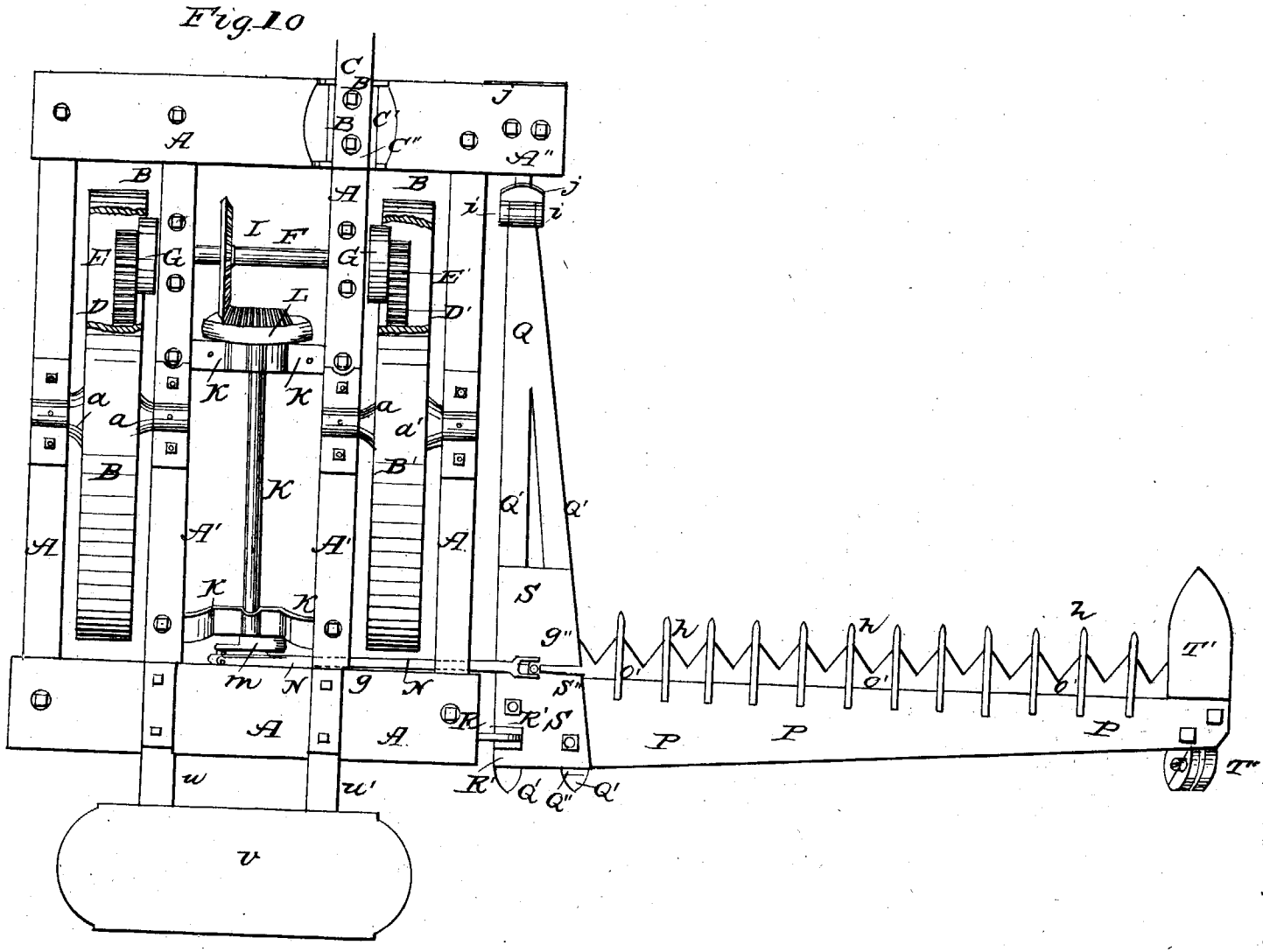

Figure 1 represents a rear view of the machine, the black lines showing the finger-beam resting upon the ground in the position it will occupy when the machine is mowing on a level surface, the blue lines showing one position of the finger-beam when mowing on an uneven surface, with its left end raised to conform thereto, the red lines showing the position of the finger-beam when mowing on an uneven surface, which raises the entire finger-beam, the dotted black lines showing the position of the finger-beam raised up at its right or outer end toward the machine to pass over an obstacle, and the dotted red lines showing the finger-beam in two different positions raised off of the ground and turned up toward the machine to pass over obstructions or through gates. Fig. 2 represents a side view of the machine, looking in the direction of arrow 1, Fig. 1, when the machine is mowing on level ground, a part of the main frame being represented as broken away to show the position of the gearing. Fig. 3 represents a section on line A B, Fig. 1, looking in the direction of arrow 3, the finger-beam being shown in the highest position, represented in red dotted lines, Fig. 1. Fig. 4 represents a detached view of a portion of one of the main wheels and a portion of its gearing, a part of the pinion which gears into one of the main gear-wheels being represented as broken away, together with its shield, to show one of the ratchet-wheels, with its pawl, spring, and case, and by which motion is communicated from the main wheel to the main gear-shaft. Fig. 5 represents a detached plan or top view of one of the pinions on the main gear-shaft, together with its ratchet-wheel and pawl, the top of the case which covers the ratchet-wheel being represented as broken away to show the relative position of the parts. Fig. 6 represents a top or plan view of my machine, a portion of the peripheries of the wheels B B′ being broken away to show the positions of the gear-wheels.

Whenever it may be expedient to use one or more of the several parts or branches of my improvements separate from the rest, such part or parts may be used in connection with proper frames and gearing, although different from those herein described, which are proportioned and arranged with reference to the use of the whole of the parts together; and it is obvious that several parts of my improvements are applicable to various other mowing-machines in use.

One mode of applying each of my improvements to practical use being shown in this machine, it is unnecessary to specify the manner of applying the parts respectively to other mowing-machines, since the ordinary skill of the constructer will be sufficient for that purpose.

That branch of my improvements which is the subject of this patent consists in the combination of certain elements in a mowing-machine, whereby its efficiency is greatly promoted and many of the objections heretofore encountered in the use of mowing-machines (especially when used on uneven and rough ground) obviated. The elements which I have thus combined are as follows, viz: First, a rigid tongue to draw and steady the machine by; second, a frame to support and carry the driver and gearing; third, two independent driving and supporting wheels (one arranged at each side of the frame) to support and balance the frame and give motion to the cutter; fourth, a short finger-beam to carry and protect the cutters, so hinged to the frame that its progressive movement over the ground will be controlled by the main frame and the free upward and downward movements of the entire finger-beam, or of either end thereof independently of the other, by the undulations of the ground over which it is drawn.

In the accompanying drawings, A A A′ A′ represent the main frame of the machine, being of rectangular form, and which is supported on the axes *a a* of the independent driving and supporting wheels B B′.

To the shaft F there are attached two shields or cases, G G′, within each of which a pawl, *b*, is secured, and these pawls catch into ratchet-teeth on the wheels H, one of which is attached to the inner side of each of the pinion-wheels E E′, or to a disk, E″, which is placed between the ratchet-wheels H and the pinions-wheels E E′, for the purpose of closing up the outer ends of the cases G G′, but which are fastened securely to their respective ratchet and pinion wheels, so that each pinion-wheel with its disk or shield E″ and ratchet-wheel H turn together and are loose on the shaft F. (See Figs. 4 and 5.)

Small springs *c* are attached to the inside of the cases G G′—one on each case—for the purpose of keeping the pawls *b* in the ratchet-teeth of the wheels H when the machine is drawn forward, but which allow the pawls *b* to slip over the teeth on the ratchet-wheels H when the machine is backed, so that the cuttters are not operated in backing the machine. Nor does one pawl or ratchet interfere with the free movement of the other. Consequently, if one wheel moves faster than the other, it operates the cutters, and therefore turning the machine from the standing grass to avoid or pass obstructions in the path of the finger-beam does not prevent the cutters from being operated by wheel B′, whereby clogging of the cutters is prevented.

As the machine is drawn over the ground by the rigid draft-pole or tongue C the driving-wheels B B′ move in the direction indicated by arrow 4, and as the spur-wheels D D′ move in the same direction the pinion-wheels E E′ are caused to move in the direction of arrow 4′, (see Fig. 4,) thus giving motion to shaft F by means of the ratchet-wheels H H, pawls *b* *b*, and cases G G′, and as the shaft F turns motion is communicated to the crank-shaft K through gear-wheels I and J, whereby a rapid reciprocating motion is imparted by means of swiveled pitman or rod N N′ to the cutter-bar O and its cutters O′, which work through fingers or guards *h*, attached to the finger-beam, the heel of the cutter-bar and inner cutter being guided in proper grooves in the metallic part S of the inner shoe.

The cutters and guard-fingers may be made in any of the well-known forms.

The inner end or heel of the finger-beam P is rigidly secured to the lower double runner or forked ends, Q′ Q′, of a strong metallic draft-shoe or yielding brace-bar *a*, the forward end of which extends upward and forward, and is hinged between lugs *i i* of a wrist or swivel, *i′*, which is free to turn on an axis parallel to the line of motion of the machine in a piece, *j*, attached to piece *j′* by a screw-pivot, the piece *j′* being bolted firmly to the under side of the inner projecting part, A″, of the main frame, while the wrist or swivel piece *i′* is held in place by nut K′.

To sustain the shoe or brace-bar Q in its lateral relative position as respects the main frame, a coupling-arm, R, is hinged at its right end between the lugs R′ R′, which project up from the left side or fork of the shoe or yielding brace-bar Q and at the heel of the finger-beam P, while its left end is hinged on a line with the longitudinal center of the crank-shaft K, between lugs *l l*, projecting down from a hanger, R″, which is firmly bolted to the rear under sides of the pieces A′ A′ of the main frame.

The outer end of the finger-beam is supported by a shoe, T′, the rear end of which is provided with a slot or opening, T″, in which the track-clearer is to be hinged. The tongue C is fitted into a metallic tongue-piece, C′, having shoulders C″, and then bolts E″ are passed down through both the tongue-piece and front piece of the main frame.

U is the driver's seat, supported by springs U′, attached to the rear of the main frame.

While the machine is in operation the finger-beam P, which supports the cutters, can freely rise and fall bodily, or either end independently of the other end and of the main frame.

As the finger-beam P is only of sufficient length to protect the cutters, its motions are not impeded at all by any elevations or obstacles in the path of the main frame, nor is the heel of the finger-beam liable to catch and drag along cut stalks of grass, as would be the case if the finger-beam extended by the rear end of the inner driving-wheel, B′, since in either case every time the outer end of the finger-beam happened to be elevated the other end, or that portion of it which extended beyond the cutters, would be forced down into the grass cut by the previous swath and catch and drag it along, thus interfering with the proper operation of the machine.

As the weight of the finger-beam and cutting apparatus rests principally on the ground, I provide for the proper balancing of the machine by placing the independent driving and supporting wheels B B′ near the center of the machine, one wheel being on each side, and arrange the gearing so that the weight thereof will be mostly in advance of the axes of the supporting-wheels, whereby I am enabled to place the seat for the driver well back on the machine, where he can have a full view of the cutting apparatus, and yet have the machine evenly and well balanced when the driver is in his seat on the machine. By the use of two independent driving-wheels the cutters are kept in motion while turning corners either to the right or left, and that, too, without the least cramping or twisting of the wheels or their journals, since one wheel can move faster than the other, and in mowing on rough and uneven ground, where there is necessarily much turning to avoid obstructions in the path of the cutters, this is very important. Again, if one wheel happens to drop into a slight hole or strikes against a small stump or stone, so as to cause it to slip on or over the ground, the other wheel operates the cutters.

What I claim under this patent as my invention is—

The combination, in a mowing-machine, of the following elements—namely, a rigid tongue to draw and steady the machine by, a frame to support and carry the driver and gearing, two independent driving and bearing or supporting wheels to carry the frame and give motion to the cutters, and a short finger-beam, so hinged to the main frame that its progressive movement over the ground will be controlled by the main frame and the upward and downward movements of the entire finger-beam, or of either end thereof independently of the other, by the undulations of the ground over which it is drawn.

In witness whereof I have hereunto signed my name.

EPHRAIM BALL.

Witnesses:
DANIEL GOTSHALL,
D. H. HARMER.